US007523285B2

(12) United States Patent
Rider et al.

(10) Patent No.: US 7,523,285 B2
(45) Date of Patent: Apr. 21, 2009

(54) THERMAL MEMORY CONTROL

(75) Inventors: Scott Rider, Beaverton, OR (US);
Frank E. LeClerg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 10/922,737

(22) Filed: Aug. 20, 2004

(65) Prior Publication Data
US 2006/0041729 A1 Feb. 23, 2006

(51) Int. Cl.
*G06F 12/00* (2006.01)
(52) U.S. Cl. ...................................... 711/170
(58) Field of Classification Search .................. 711/170
See application file for complete search history.

(56) References Cited

U.S. PATENT DOCUMENTS

| | | | |
|---|---|---|---|
| 4,843,026 A | | 6/1989 | Ong et al. |
| 5,787,462 A | * | 7/1998 | Hafner et al. ............... 711/114 |
| 5,809,547 A | * | 9/1998 | Taoda ......................... 711/165 |
| 5,835,963 A | * | 11/1998 | Yoshioka et al. ............ 711/207 |
| 5,897,663 A | | 4/1999 | Stancil |
| 5,918,982 A | | 7/1999 | Nagata et al. |
| 6,020,834 A | | 2/2000 | Rider |
| 6,021,076 A | | 2/2000 | Woo et al. |
| 6,047,373 A | | 4/2000 | Hall et al. |
| 6,122,733 A | | 9/2000 | Christeson et al. |
| 6,256,731 B1 | | 7/2001 | Hall et al. |
| 6,314,503 B1 | * | 11/2001 | D'Errico et al. ............. 711/165 |
| 6,324,620 B1 | * | 11/2001 | Christenson et al. ........ 711/112 |
| 6,453,218 B1 | | 9/2002 | Vergis |
| 6,507,530 B1 | | 1/2003 | Williams et al. |
| 6,567,763 B1 | | 5/2003 | Javanifard et al. |
| 6,611,911 B1 | | 8/2003 | O'Shea et al. |
| 6,809,978 B2 | | 10/2004 | Alexander et al. |
| 6,836,704 B2 | | 12/2004 | Walsh |
| 6,870,357 B1 | | 3/2005 | Falik |
| 6,888,763 B1 | | 5/2005 | Guo |
| 6,895,483 B2 | * | 5/2005 | Eguchi et al. ............... 711/165 |
| 6,941,432 B2 | * | 9/2005 | Ronstrom .................... 711/165 |
| 6,955,164 B2 | | 10/2005 | Kesler et al. |
| 6,963,959 B2 | * | 11/2005 | Hsu et al. .................... 711/165 |
| 7,032,070 B2 | * | 4/2006 | Kodama ...................... 711/114 |
| 7,035,159 B2 | | 4/2006 | Janzen et al. |
| 7,099,735 B2 | | 8/2006 | Jain et al. |
| 7,260,007 B2 | | 8/2007 | Jain et al. |
| 7,266,031 B2 | | 9/2007 | Kim et al. |
| 7,412,614 B2 | | 8/2008 | Ku |
| 2001/0026576 A1 | | 10/2001 | Beer et al. |

(Continued)

OTHER PUBLICATIONS

U.S. Appl. No. 10/676,137, filed Sep. 30, 2003, LeClerg et al.

(Continued)

*Primary Examiner*—Matt Kim
*Assistant Examiner*—Ryan Dare
(74) *Attorney, Agent, or Firm*—Blakely, Sokoloff, Taylor & Zafman LLP

(57) ABSTRACT

The present disclosure relates to resource management of memory using information regarding the physical state of the memory device(s), and, more specifically, to attempting to reduce the heat dissipation of a memory device by managing the contents of the memory device.

20 Claims, 5 Drawing Sheets

U.S. PATENT DOCUMENTS

| | | | |
|---|---|---|---|
| 2002/0059539 A1* | 5/2002 | Anderson | 714/6 |
| 2002/0180543 A1 | 12/2002 | Song et al. | |
| 2003/0103402 A1 | 6/2003 | Tran et al. | |
| 2003/0145194 A1 | 7/2003 | O'Shea et al. | |
| 2003/0158696 A1 | 8/2003 | Gold et al. | |
| 2003/0177293 A1* | 9/2003 | Bilak et al. | 710/56 |
| 2003/0185058 A1 | 10/2003 | LeClerg | |
| 2003/0210506 A1 | 11/2003 | Edmonds et al. | |
| 2004/0141370 A1 | 7/2004 | Tran et al. | |
| 2004/0215912 A1 | 10/2004 | Vergis | |
| 2004/0267984 A1* | 12/2004 | Fukushima et al. | 710/60 |
| 2005/0050279 A1* | 3/2005 | Chiu et al. | 711/137 |
| 2005/0081010 A1* | 4/2005 | DeWitt et al. | 711/165 |
| 2006/0221741 A1 | 10/2006 | Jain et al. | |
| 2006/0239095 A1 | 10/2006 | Shi et al. | |
| 2006/0265615 A1 | 11/2006 | Janzen et al. | |

OTHER PUBLICATIONS

"42P19162 FOA mailed Apr. 9, 2007 for U.S. Appl. No. 10/852,923", (Apr. 9, 2007), 5 pgs.

"42P19162 NALL mailed Jul. 19, 2007 for U.S. Appl. No. 10/852,923", (Jul. 19, 2007), 7 pgs.

"42P19162 OA mailed May 31, 2006 for U.S. Appl. No. 10/852,923", (May 31, 2006), 10 pgs.

"42P19162D OA mailed Feb. 21, 2008 for U.S. Appl. No. 11/924,754", (Feb. 21, 2008), 10 pgs.

"PCT ISR & WO mailted Dec. 15, 2005 for International Application PCT/US2005/015886", (Jan. 4, 2006), 13 pgs.

Patent Office of PRC, "Notice of Grant for Chinese Application No. 200580016090.2", with translation, (Aug. 8, 2008), Whole document.

Patent Office of PRC, "Office Action for Chinese Patent Application No. 200580016090.2", with translation, (Mar. 21, 2008), Whole document.

Patent Office of PRC, "Office Action for Chinese Patent Application No. 200580016090.2", (Dec. 14, 2007), Whole document.

USPTO, "42P19162D Final Office Action mailed Oct. 1, 2008 for U.S. Appl. No. 11/924,754", (Oct. 1, 2008), Whole document.

WIPO, "International Report on Patentability for PCT/US2005/015886", (Dec. 7, 2006), Whole document.

* cited by examiner

THERMAL MEMORY CONTROL

BACKGROUND

1. Field

The present disclosure relates to resource management of memory using information regarding the physical state of the memory device(s), and, more specifically, to attempting to reduce the heat dissipation of a memory device by managing the contents of the memory device.

2. Background Information

Currently most electrical devices generate heat during operation. Memory devices generate heat when data is read from or written to the device. Typically the heat generated by such accesses is minimal. Usually, the data stored in each memory element is accessed so infrequently that any generated heat has the opportunity to dissipate before the next access generates additional heat. However, when a particular memory element is accessed frequently, the generated heat may build-up and become noticeable. This heat build-up may then cause undesirable effects.

Typically in modern processing systems very little thought is given to the heat generated and dissipated by the system memory devices. If any technique is used to manage the heat generated by these devices, if often occurs in one of two ways.

In one known technique, a heat sink or heat spreader is attached to the memory device. The heat spreader is typically a piece of metal or other thermally conductive material that facilitates the transfer of heat from the memory element to the ambient environment, typically air or fluid, if water-cooled. In some cases a fan or pump may be employed to provide circulation of the ambient environment.

In another technique, thermal monitoring may be used to determine when the memory element is overheating, or has otherwise reached a thermal limit. Upon reaching this limit, a system may typically throttle memory access, which decreases performance.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In this context, a "memory element" is any memory device of various size. The term includes the terms, such as, for example, "memory chip," "memory module," and "memory bank."

In this context, "memory chip" is defined as an integrated chip comprising several memory locations. A memory chip is typically, but not limited to, being comprised of Dynamic Random Access Memory (DRAM), Static Random Access Memory (SRAM), Flash memory, Read-Only Memory (ROM) or another form of memory.

In this context, "memory module" is defined as device comprising, typically, multiple memory chips arranged to facility access to the memory chips. A memory module is often, but not necessarily, a small circuit board carrying several memory chips.

In this context, "memory bank" is defined as a portion of a system that includes slots, or other connections, for memory modules. Typically memory banks are organized into units representing the minimum or maximum number of memory chips the system is designed to allow to operate in tandem.

Figure 1:
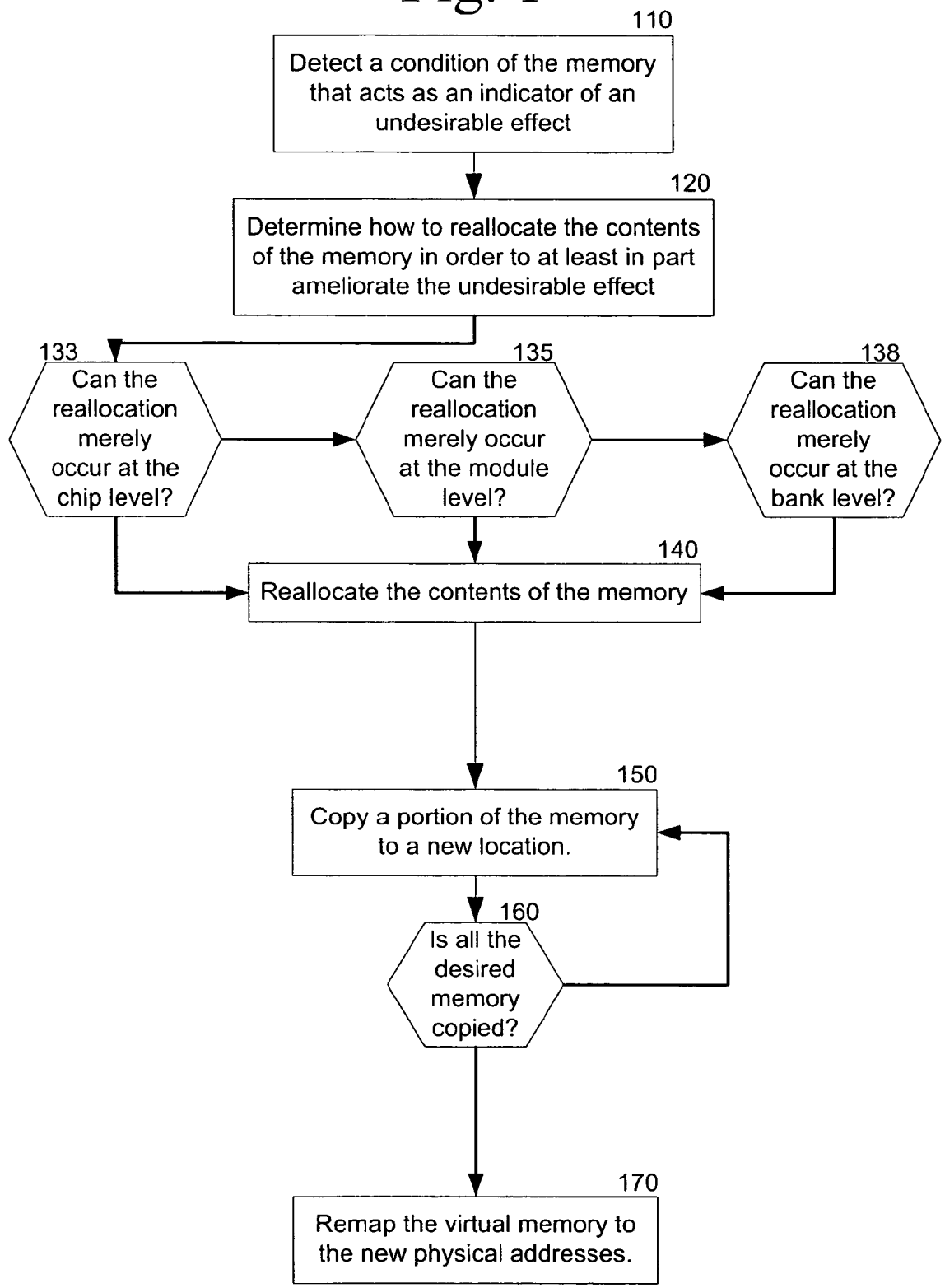
FIG. 1 is a flowchart illustrating an embodiment of a memory resource management technique in accordance with the claimed subject matter.

FIG. 1 is a flowchart illustrating an embodiment of a memory resource management technique in accordance with the claimed subject matter. Block 110 illustrates that a condition of the memory may be detected. This condition may act as an indicator of an undesirable effect, such as, for example, in one embodiment excessive or over-heating of the memory element or, in another example, limited or reduced performance; however, other undesirable effects are contemplated and within the scope of the disclosed matter. It is contemplated that the condition may in one embodiment include such things as frequent access to the same area of memory, a signal from a thermal sensor, or information obtained about how a program intends to access a specific portion of memory; however, it is understood that these are merely a few non-limiting examples.

Block 120 illustrates that it may be determined how to reallocate the contents of the memory in order to at least in part ameliorate the undesirable effect. It is contemplated that, in one embodiment, the contents of the memory may be moved or copied from a comparatively large portion of memory to a plurality of comparatively smaller memory portions. It is contemplated that by spreading the contents of the memory portion from one memory element to multiple memory elements the undesirable effect may be reduced or avoided.

For example, in one embodiment, if the undesirable effect is excessive heat generation, by moving the contents of the memory portion to multiple memory elements, the heat generated by access to that memory portion will be spread across the multiple elements as opposed to concentrated at the single original memory element.

In another illustrative embodiment, if the undesirable effect is reduced performance, by moving the contents of the memory portion to multiple memory elements, the memory elements may be accessed in parallel or a quicker fashion and performance may be increased. However, these are merely two illustrative embodiments and other embodiments are contemplated and within the scope of the disclosed subject matter.

Blocks 133, 135, & 138 illustrate that, in one embodiment, an attempt may be made to minimize the number of levels of memory hierarchy that are affected by the reallocation. Block 133 illustrates that an attempt may be made to ameliorate the undesirable effect by merely reallocating the contents of the memory portion from one memory chip to multiple memory chips. Block 135 illustrates a similar concept but at the memory module level, i.e. reallocating the memory portion from one memory module to multiple memory modules. Block 138 illustrates a similar concept but at the memory bank level, i.e. reallocating the memory portion from one memory bank to multiple memory banks. It is understood that multiple reallocation techniques and preferences may be used and are within the scope of the disclosed subject matter.

Block 140 illustrates that the contents of the targeted memory portion may be reallocated amongst memory elements. In one embodiment, Block 150 illustrates that the contents of a sub-portion of the affected memory portion may be copied to a new location. Block 160 illustrates that this may occur until all desired sub-portions of the affected memory portion is copied.

Figure 3:
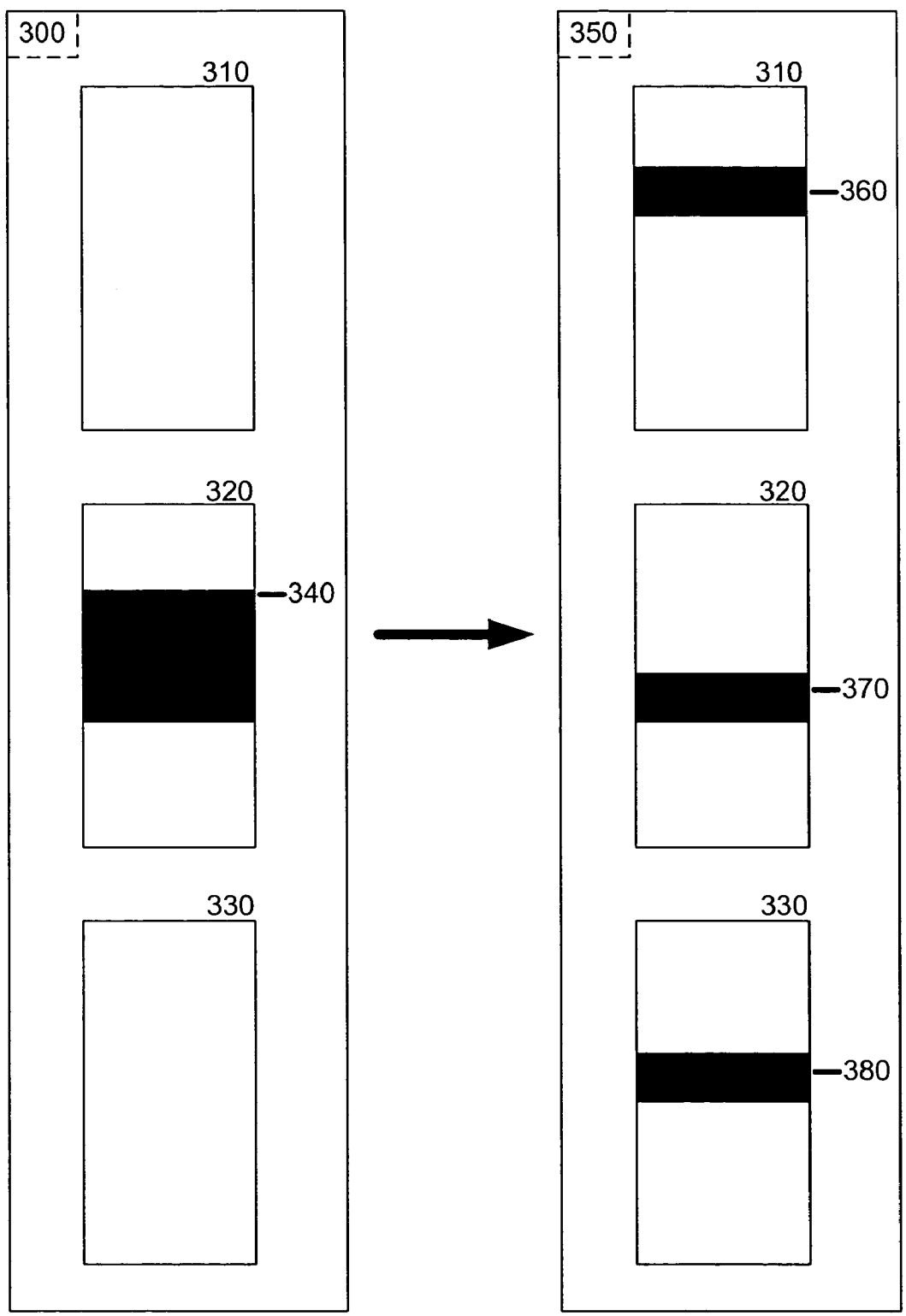
FIG. 3 is a block diagram illustrating an embodiment of a memory resource management technique in accordance with the claimed subject matter.

FIG. 3 is a block diagram illustrating an embodiment of a memory resource management technique in accordance with the claimed subject matter. FIG. 3 provides a graphical illustration of an embodiment the reallocation process. In memory state 300, three memory elements 310, 320 & 330 exist. Memory portion 340 is stored within memory element 320. As described above and illustrated in FIG. 1, the memory portion 340 is detected as causing an undesirable effect. The memory portion is then reallocated across the three memory elements.

Memory state 350 illustrates that the contents of memory portion 340 have been moved from memory element 320. The memory portion 340 has been sub-divided into three sub-portions 360, 370, & 380. These three sub-portions have been moved to memory elements 310, 320, & 330, respectively. It is contemplated that in one embodiment, the memory portions may have been copied from portion 340, allowing portion 340 to be accessed while the copying operations took place, or in another embodiment, it is contemplated that normal access to portion 340 was halted and the portions were moved; however, other reallocation techniques are contemplated and within the scope of the disclosed matter.

It is also understood that while FIG. 3 shows three sub-portions of roughly identical size, the sub-portions may be of any size. It is further understood that while FIG. 3 shows the memory portion 340 reallocated across all available memory elements, the disclosed subject matter is not limited to reallocating across any specific number or percentage of memory elements. It is yet further understood that while sub-portion 370 does not appear to have moved from the same memory location as portion 340, the invention is not limited to keeping any sub-portion in a specific location, or moving every sub-portion from the original location.

Returning to FIG. 1, Block 170 illustrates that in one embodiment, the virtual memory tables may be remapped to point to the new post-reallocation physical memory address. In many systems, the memory addresses provided to the processor or software are virtual addresses that map to the physical addresses of the memory elements. By remapping the virtual address of the original memory portion to the new memory portions, it is contemplated that the memory reallocation may appear as seamless to the rest of the system as possible. It is contemplated that in one embodiment the remapping action may take place during the reallocation action; such as, for example, the remapping may occur as part of, in parallel with, or substantially simultaneously with the reallocation.

Figure 2:
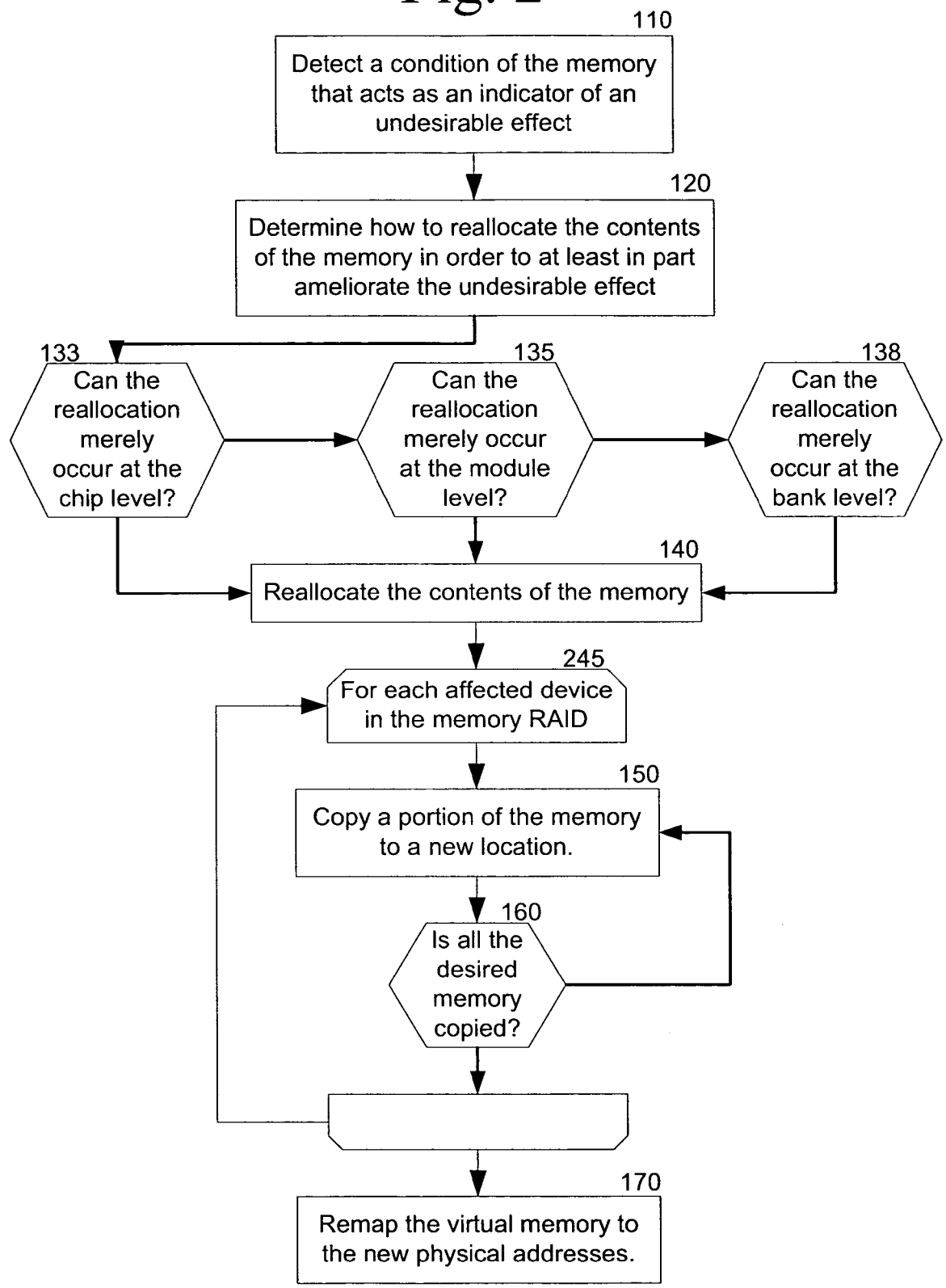
FIG. 2 is a flowchart illustrating an embodiment of a memory resource management technique in accordance with the claimed subject matter.

FIG. 2 is a flowchart illustrating an embodiment of a memory resource management technique in accordance with the claimed subject matter. FIG. 2 illustrates an embodiment where the technique of FIG. 1 has been modified to include Redundant Arrays of Independent Devices (RAID). Typically RAID is used in the context of hard drives and other non-volatile memory devices, where it is also referred to by the terms "Redundant Arrays of Inexpensive Drives" or "Redundant Arrays of Independent Drives". It endeavors to provide reliable storage at relatively reasonable costs. However, in this context, RAID may also be used to provide volatile memory storage. It is contemplated that a number of memory elements may be used to provide reliable volatile memory storage at relatively reasonable costs using substantially similar techniques or techniques derived from those used for non-volatile storage RAID. It is further contemplated that some embodiments of the disclosed subject matter may include substantially non-volatile memory elements, such as, for example, flash RAM.

Block 245 illustrates that the reallocation process may be carried out for each affect device in the memory RAID. It is contemplated that in one embodiment, the redundancy of the array may be affected while first one memory device is reallocated than another, and so forth. In one embodiment, the array may be inaccessible during the reallocation process.

Figure 4:
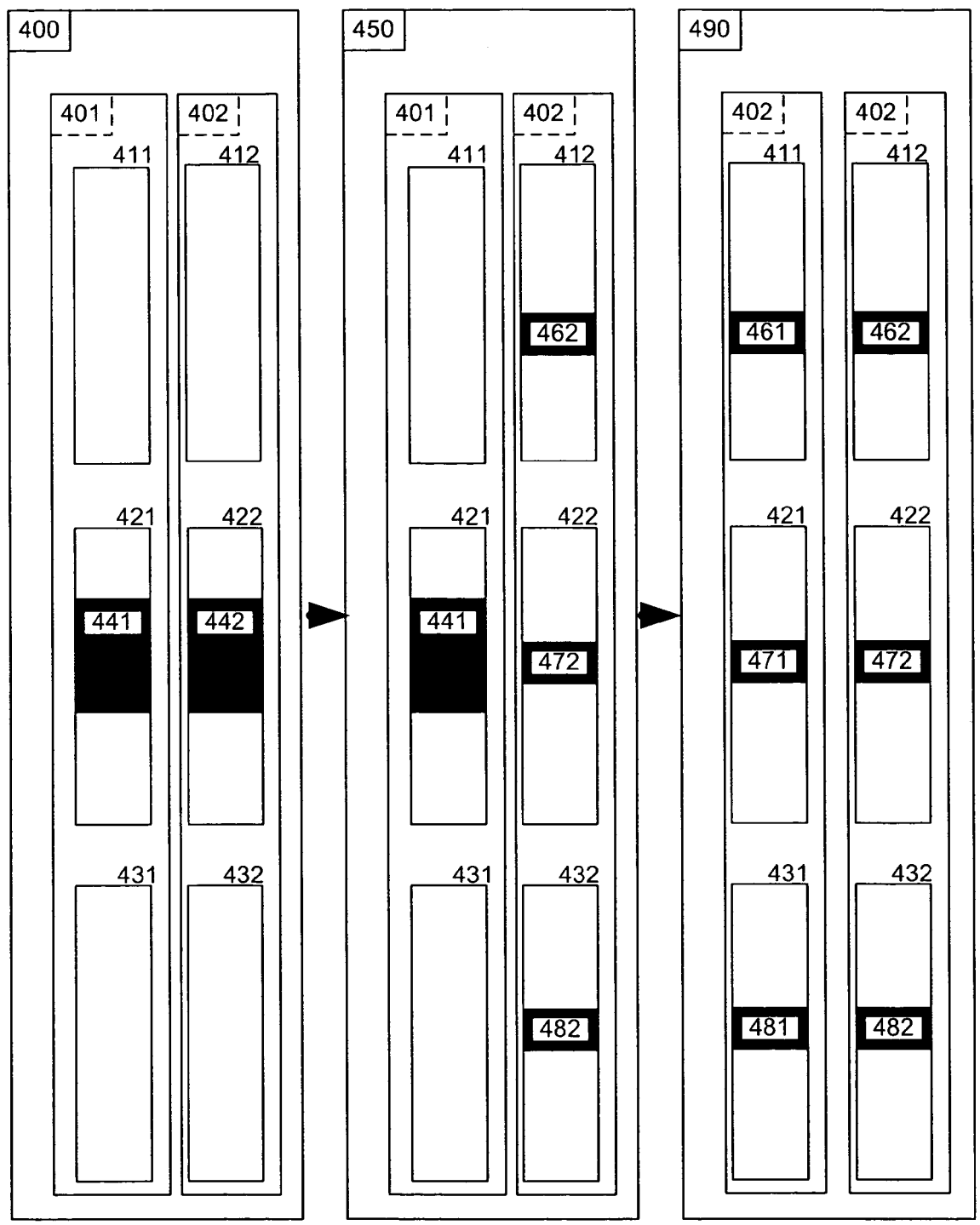
FIG. 4 is a block diagram illustrating an embodiment of a memory resource management technique in accordance with the claimed subject matter.

FIG. 4 is a block diagram illustrating an embodiment of a memory resource management technique in accordance with the claimed subject matter. Memory state 400 includes memory devices 401 & 402 arranged in what is known as a RAID 1 (a.k.a. data mirroring) configuration, although other RAID configurations are contemplated and within the scope of the invention. In this embodiment, memory device 402 acts as a backup of memory device 401. The memory devices include memory portions 441 & 442, respectively.

Memory state 450 illustrates that, in one embodiment, memory device 402 may undergo reallocation first. Memory portion 442 may be moved or copied from memory element 422 to memory sub-portions 462, 472, & 482 on memory elements 412, 422, & 432, respectively. During this time, it is contemplated that access to the array may be, for example, limited in the entirety, limited to read-only access for the array, or not restricted at all; however, these are merely a few non-limiting examples.

Memory state 490 illustrates that both memory devices have completed the reallocation process and are once again in-sync, as dictated by the RAID 1 standard. The memory portion 441 of memory device 401 has been reallocated to sub-portions 481, 471, & 461 on memory elements 431, 421, & 411, respectively. It is contemplated that in one embodiment, if any access restrictions were placed upon the RAID system during the reallocation process those restrictions may be lifted when memory state 490 is reached.

It is contemplated that in one embodiment, the memory portions may have been copied from portions 441 & 442, allowing one or both portions to be accessed while the copying operations took place, or in another embodiment, it is contemplated that normal access to portions 441 & 442 were halted and the portions were moved; however, other reallocation techniques are contemplated and within the scope of the disclosed matter.

It is also understood that while FIG. 4 shows three sub-portions of roughly identical size, the sub-portions may be of any size. It is further understood that while FIG. 4 shows the memory portions 441 & 442 reallocated across all available memory elements, the disclosed subject matter is not limited to reallocating across any specific number or percentage of memory elements. It is yet further understood that while sub-portions 471 & 472 do not appear to have moved from the same memory location as portions 441 & 442, respectively, the invention is not limited to keeping any sub-portion in a specific location, or moving every sub-portion from the original location.

Figure 5:
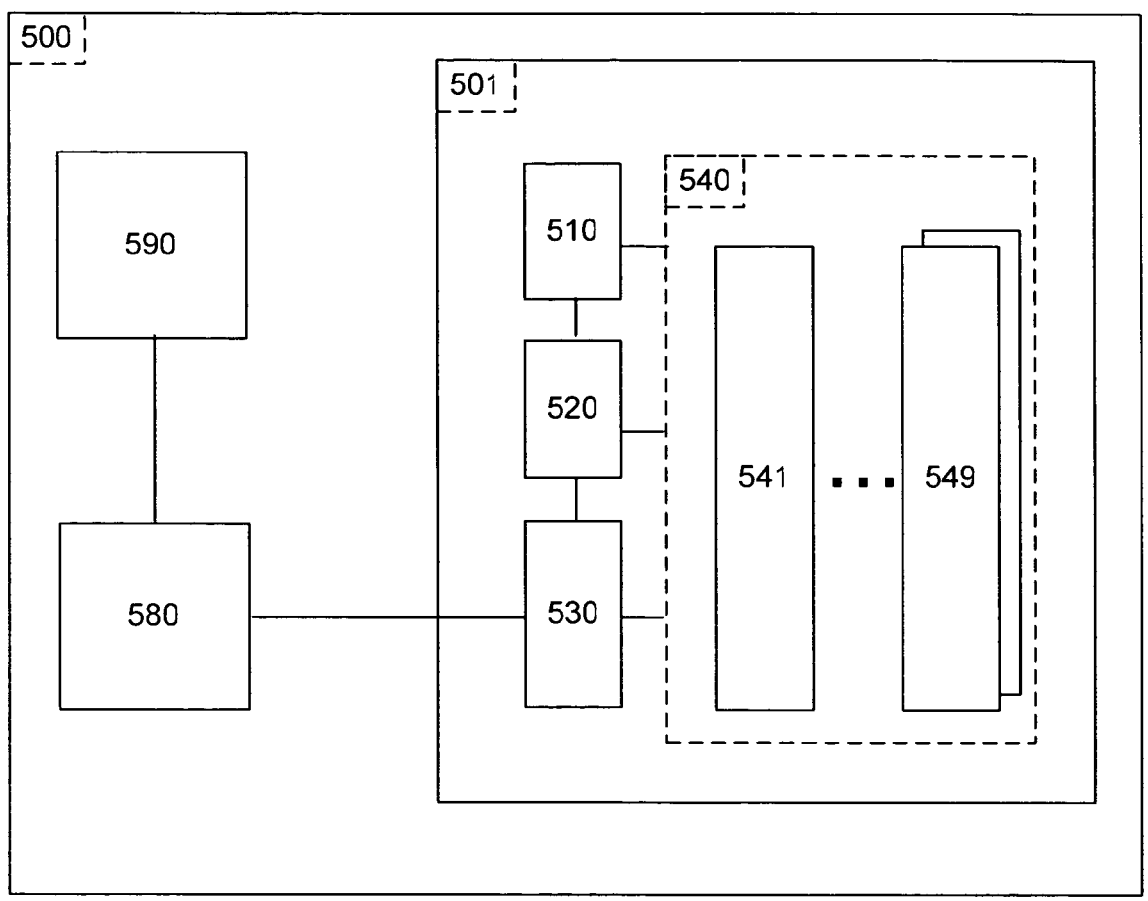
FIG. 5 is a block diagram illustrating an embodiment of an apparatus and a system that is capable of memory resource management in accordance with the claimed subject matter.

FIG. 5 is a block diagram illustrating an embodiment of an apparatus 501 and a system 500 that is capable of memory resource management in accordance with the claimed subject matter. Apparatus 501, in one embodiment, may include condition detector 510, memory reallocator 520, and memory 540. Memory 540 may include a number of memory elements, illustrated by memory elements 541 and 549. In one embodiment, the apparatus may be capable of performing one or both of the techniques illustrated by FIGS. 1 & 2.

Condition Detector 510 may be capable of detecting that a condition exists in memory 540 that may result in an undesired effect, as illustrated by Block 110 of FIG. 1. Memory Reallocator 520 may then determine how to reallocate the contents of the memory in order to attempt to ameliorate the undesired effect, as illustrated by Blocks 120, 133, 135, & 138 of FIG. 1. The Memory Reallocator may then reallocate the memory according to that determination, as illustrated by Blocks 140, 150, & 160 of FIG. 1 and Block 245 of FIG. 2. In one embodiment, the reallocation may occur as described above and illustrated in FIGS. 1, 2, 3, & 4.

In another embodiment, the apparatus may also include a Virtual Memory Map 530. This map may be a table that facilitates the conversion of virtual memory addresses to physical memory addresses. It is contemplated that this Virtual Memory Map may, in one embodiment, be different from the system level virtual memory map. It is also contemplated that the system level memory map may map system level virtual memory addresses to apparatus level memory addresses, which are then in turned mapped to physical address by Virtual Memory Map 530. It is contemplated that this double indirection may occur with or without the knowledge of the system. However, this is merely one embodiment, and other embodiments are within the scope of the disclosed subject matter.

System 500 may include apparatus 501, a processor 590, and a memory controller 580. In one embodiment, the processor may be capable of processing instructions and/or data stored in memory 540. In one embodiment, the memory controller may be capable of controlling the processor's access to the memory. In one embodiment, the Virtual Memory Map may be part of or integrated with apparatus 501, memory controller 580, processor 590, or a substantially independent component of system 500.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. A method comprising:
    detecting a condition of a physical state of a first memory chip, wherein the condition acts as an indicator of excessive heating in the first chip;
    identifying a first portion of memory located within the first chip, and dividing the first portion into a plurality of first sub-portions; and
    moving at least one of the first sub-portions from the first chip to at least a second chip in response to detecting the condition indicating excessive heating in the first chip to facilitate ameliorating the excessive heating, wherein the first and second memory chips are within a first RAM array mirrored by a third and fourth memory chip within a second RAM array in a Redundant Array of Independent Devices (RAID) system; and wherein moving the contents of the first memory chip includes:
    identifying a second portion of memory located within the third memory chip, the second portion of memory mirroring the first portion of memory;
    dividing the second portion into a plurality of second sub-portions; and
    moving at least one of the second sub-portions from the third memory chip to at least the fourth memory chip prior to synchronizing the new memory locations between the first and second RAM arrays by moving the at least one first sub-portion in the first memory chip.

2. The method of claim 1, wherein moving the contents of the first memory chip includes moving based upon directions received from a device selected from a group consisting of:
    a processor;
    a processor, including an integrated memory controller;
    a chipset level memory controller; and
    a memory module level memory controller.

3. The method of claim 1, farther comprising remapping a virtual memory map after moving at least one of the plurality of second sub-portions from the third memory chip to the fourth memory chip, such that a set of virtual addresses that correlated with the physical addresses associated with the first memory chip are remapped to correlate with the physical addresses associated with the moved second sub-portions in the fourth memory chip to provide a processor unrestricted access to the contents of the first memory chip while the contents of the first memory chip are reallocated to the second memory chip.

4. The method of claim 1, wherein detecting a condition of a physical state of a first memory chip includes one of the conditions selected from a group consisting of:
- frequent memory accesses to the same location;
- a signal from a thermal sensor;
- a performance limitation; and
- a performance decrease.

5. The method of claim 1, wherein the first memory chip is selected from the group consisting of: DRAM, SRAM, flash memory and ROM.

6. An article comprising:
- a machine accessible storage medium having instructions stored thereon, wherein when the instructions are executed, the instructions provide for:
- detecting a condition of a physical state of a first memory chip, wherein the condition acts as an indicator of excessive heating in the first memory chip;
- determining how to reallocate the contents of the first memory element to at least in part ameliorate the excessive heating;
- identifying a first portion of memory located within the first chip, and dividing the first portion into a plurality of first sub-portions; and
- moving at least one of the first sub-portions from the first chip to at least a second chip in response to detecting the condition indicating excessive heating in the first RAM element
- to facilitate ameliorating the excessive heating, wherein the first and second memory chips are within a first RAM array mirrored by a third and fourth memory chip within a second RAM array in a Redundant Array of Independent Devices (RAID) system; and wherein moving the contents of the first memory chip includes:
- identifying a second portion of memory located within the third memory chip, the second portion of memory mirroring the first portion of memory;
- dividing the second portion into a plurality of second sub-portions; and
- moving at least one of the second sub-portions from the third memory chip to at least the fourth memory chip prior to synchronizing the new memory locations between the first and second RAM arrays by moving the at least one first sub-portion in the first memory chip.

7. The article of claim 6, wherein the instructions moving the contents of the first memory chip include instructions providing for moving based upon directions received from a device selected from a group consisting of:
- a processor;
- a processor, including an integrated memory controller;
- a chipset level memory controller; and
- a memory module level memory controller.

8. The article of claim 6, wherein the instructions providing for moving the contents include instructions providing for:
- remapping the virtual memory map after moving at least one of the plurality of second sub-portions from the third memory chip to the fourth memory chip, such that a set of virtual addresses that correlated with the physical addresses associated with the first memory chip are remapped to correlate with the physical addresses associated with the moved second sub-portions in the fourth memory chip to provide a processor unrestricted access to the contents of the first memory chip while the contents of the first memory chip are reallocated to the second memory chip.

9. The article of claim 6, wherein the instructions providing for detecting a condition of a physical state of a first memory chip include instructions providing for one of the conditions selected from a group consisting of:
- frequent memory accesses to the same location;
- a signal from a thermal sensor;
- a performance limitation; and
- a performance decrease.

10. The article of claim 6, wherein the instructions providing for determining how to reallocate include instructions providing for:
- identifying a first portion of memory located within the first memory chip, wherein the first memory chip is selected from the group consisting of: DRAM, SRAM, flash memory and ROM.

11. An apparatus comprising:
- a first memory chip to store either data, instructions, or a mixture of both;
- a condition detector that is capable of detecting a condition of a physical state of the first memory chip, wherein the condition acts as an indicator of excessive heating in the first memory chip; and
- a memory reallocator configured for:
- determining how to reallocate the contents of the first memory element in order to at least in part ameliorate the excessive heating, and
- identifying a first portion of memory located within the first memory chip, and dividing the first portion into a plurality of first sub-portions;
- moving at least one of the first sub-portions from the first memory chip to at least a second memory chip in response to detecting the condition indicating excessive heating in the first memory chip to facilitate ameliorating the excessive heating, wherein the first and second memory chips are within a first RAM array mirrored by a third and fourth memory chip within a second RAM array in a Redundant Array of Independent Devices (RAID) system; and wherein moving the contents of the first memory chip includes:
- identifying a second portion of memory located within the third memory chip, the second portion of memory mirroring the first portion of memory;
- dividing the second portion into a plurality of second sub-portions; and
- moving at least one of the second sub-portions from the third memory chip to at least the fourth memory chip prior to synchronizing the new memory locations between the first and second RAM arrays by moving the at least one first sub-portion in the first memory chip.

12. The apparatus of claim 11, wherein moving the contents of the first memory chip includes moving based upon directions received from a device selected from a group consisting of:
- a processor;
- a processor, including an integrated memory controller;
- a chipset level memory controller; and
- a memory module level memory controller.

13. The apparatus of claim 11, further comprising a virtual memory map that correlates virtual memory addresses to physical memory addresses; and wherein the memory reallocator is further capable of remapping the virtual memory map after moving at least one of the plurality of second sub-portions from the third memory chip to the fourth memory chip, such that a set of virtual addresses that correlated with the physical addresses associated with the first memory chip are remapped to correlate with the physical addresses associated with the moved second sub-portions in the fourth memory chip to provide a processor unrestricted access to the contents of the first memory chip while the contents of the first memory chip are reallocated to the second memory chip.

14. The apparatus of claim 11, wherein detecting a condition of a physical state of the first memory chip includes one of the conditions selected from a group consisting of:
   frequent memory accesses to the same location;
   a signal from a thermal sensor;
   a performance limitation; and
   a performance decrease.

15. The apparatus of claim 11, wherein the first memory chip is selected from the group consisting of: DRAM, SRAM, flash memory and ROM.

16. A system comprising:
   a first memory chip to store either data, instructions, or a mixture of both;
   a processor to access the contents of the first memory chip;
   a memory controller to at least in part control the processor's access to the first memory chip;
   a condition detector that is capable of detecting a condition of a physical state of the first memory element, wherein the condition acts as an indicator of excessive heating in the first memory chip; and
   a memory reallocator that is configured for:
      determining how to reallocate the contents of the first memory element, in order to at least in part ameliorate the excessive heating,
      identifying a first portion of memory located within the first memory chip, and dividing the first portion into a plurality of first sub-portions; and
   moving at least one of the first sub-portions from the first memory chip to at least a second memory chip in response to detecting the condition indicating excessive heating in the first memory chip to facilitate ameliorating the excessive heating, wherein the first and second memory chips are within a first RAM array mirrored by a third and fourth memory chip within a second RAM array in a Redundant Array of Independent Devices (RAID) system; and wherein moving the contents of the first memory chip includes:
   identifying a second portion of memory located within the third memory chip, the second portion of memory mirroring the first portion of memory;
   dividing the second portion into a plurality of second sub-portions; and moving at least one of the second sub-portions from the third memory chip to at least the fourth memory chip prior to synchronizing the new memory locations between the first and second RAM arrays by moving the at least one first sub-portion in the first memory chip.

17. The system of claim 16, wherein moving the contents of the first RAM element includes moving based upon directions received from a device selected from a group consisting of:
   a processor;
   a processor, including an integrated memory controller;
   a chipset level memory controller; and
   a memory module level memory controller.

18. The system of claim 16, farther comprising a virtual memory map that correlates virtual memory addresses to physical memory addresses; and wherein the memory reallocator is further capable of remapping the virtual memory map after moving at least one of the plurality of second sub-portions from the third memory chip to the fourth memory chip, such that a set of virtual addresses that correlated with the physical addresses associated with the first memory chip are remapped to correlate with the physical addresses associated with the moved second sub-portions in the fourth memory chip to provide a processor unrestricted access to the contents of the first memory chip while the contents of the first memory chip are reallocated to the second memory chip.

19. The system of claim 16, wherein detecting a condition of a physical state of the first memory chip includes one of the conditions selected from a group consisting of:
   frequent memory accesses to the same location;
   a signal from a thermal sensor;
   a performance limitation; and
   a performance decrease.

20. The system of claim 16, wherein the first memory chip is selected from the group consisting of: DRAM, SRAM, flash memory and ROM.

* * * * *

UNITED STATES PATENT AND TRADEMARK OFFICE
CERTIFICATE OF CORRECTION

PATENT NO. : 7,523,285 B2  Page 1 of 1
APPLICATION NO. : 10/922737
DATED : April 21, 2009
INVENTOR(S) : Rider et al.

It is certified that error appears in the above-identified patent and that said Letters Patent is hereby corrected as shown below:

In column 6, at line 57 delete, "farther" and insert --further--.

In column 10, at line 17 delete, "farther" and insert --further--.

Signed and Sealed this

Twenty-third Day of November, 2010

David J. Kappos
*Director of the United States Patent and Trademark Office*